United States Patent
Chien et al.

(10) Patent No.: US 10,431,391 B2
(45) Date of Patent: Oct. 1, 2019

(54) CAPACITOR PACKAGE STRUCTURE AND ANTI-OXIDATION ELECTRODE FOIL THEREOF

(71) Applicant: APAQ TECHNOLOGY CO., LTD., Miaoli County (TW)

(72) Inventors: Ming-Goo Chien, Taichung (TW); Chieh Lin, Hsinchu County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 15/717,615

(22) Filed: Sep. 27, 2017

(65) Prior Publication Data
US 2018/0233293 A1   Aug. 16, 2018

(30) Foreign Application Priority Data
Feb. 13, 2017   (TW) .............................. 106104609 A

(51) Int. Cl.
| | |
|---|---|
| H01G 9/15 | (2006.01) |
| H01G 9/048 | (2006.01) |
| H01G 9/042 | (2006.01) |
| H01G 9/012 | (2006.01) |
| H01G 11/24 | (2013.01) |
| H01G 11/26 | (2013.01) |
| H01G 11/30 | (2013.01) |
| H01G 9/10 | (2006.01) |

(52) U.S. Cl.
CPC ............. *H01G 9/048* (2013.01); *H01G 9/012* (2013.01); *H01G 9/042* (2013.01); *H01G 9/0425* (2013.01); *H01G 9/10* (2013.01); *H01G 9/151* (2013.01)

(58) Field of Classification Search
CPC ................... H01G 9/048; H01G 9/042; H01G 2009/0404; H01G 11/24; H01G 11/30; H01G 11/26; H01G 9/151; H01G 9/012
USPC .......................... 361/502, 511, 523, 528, 532
See application file for complete search history.

(56) References Cited

U.S. PATENT DOCUMENTS

| | | | | |
|---|---|---|---|---|
| 5,150,283 A | * | 9/1992 | Yoshida ................. | H01G 11/52 29/25.03 |
| 6,201,685 B1 | * | 3/2001 | Jerabek .................. | H01G 9/155 29/25.03 |

* cited by examiner

*Primary Examiner* — Eric W Thomas
*Assistant Examiner* — Arun Ramaswamy
(74) *Attorney, Agent, or Firm* — Li & Cai Intellectual Property (USA) Office

(57) ABSTRACT

The present disclosure provides a capacitor package structure and an anti-oxidation electrode foil thereof. The anti-oxidation electrode foil includes a base material structure, a first conductive material structure, and a first carbonaceous material structure. The base material structure has a top surface and a bottom surface. The first conductive material structure is disposed on the top surface of the base material structure. The first carbonaceous material structure is disposed on the first conductive material structure. One portion of the first conductive material structure is a first oxygenated metal compound for contacting the first carbonaceous material structure. The first oxygen-containing metal compound layer is disposed between the other portion of the first conductive material structure and the first carbonaceous material structure so as to prevent oxygen from contacting the other portion of the first conductive material structure.

10 Claims, 11 Drawing Sheets

CAPACITOR PACKAGE STRUCTURE AND ANTI-OXIDATION ELECTRODE FOIL THEREOF

FIELD OF THE INVENTION

The present disclosure relates to a package structure and an electrode foil thereof, and more particularly to a capacitor package structure and an anti-oxidation electrode foil thereof.

BACKGROUND OF THE INVENTION

Various applications of capacitors include home appliances, computer motherboards and peripherals, power supplies, communication products and automobiles. The capacitors such as solid electrolytic capacitors are mainly used to provide the functions of filtering, bypassing, rectifying, coupling, blocking or transforming. Since the solid electrolytic capacitor has the advantages of small size, large electrical capacitance and good frequency characteristic, it can be used as a decoupling element in the power circuit of a central processing unit (CPU). In general, a plurality of capacitor elements are stacked together to form a stacked solid electrolytic capacitor with a high electrical capacitance. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE INVENTION

One aspect of the present disclosure relates to a capacitor package structure and an anti-oxidation electrode foil thereof.

One of the embodiments of the present disclosure provides an anti-oxidation electrode foil, including a base material structure, a first conductive material structure and a first carbonaceous material structure. The base material structure has a top surface and a bottom surface. The first conductive material structure is disposed on the top surface of the base material structure. The first carbonaceous material structure is disposed on the first conductive material structure. More particularly, one portion of the first conductive material structure is a first outermost layer for contacting the first carbonaceous material structure, the first outermost layer of the first conductive material structure is a first oxygen-containing metal compound layer formed by an oxidation process, and the first oxygen-containing metal compound layer is disposed between the other portion of the first conductive material structure and the first carbonaceous material structure so as to prevent oxygen from contacting the other portion of the first conductive material structure.

Another one of the embodiments of the present disclosure provides an anti-oxidation electrode foil, including a base material structure, a first conductive material structure and a first carbonaceous material structure. The first conductive material structure is disposed on the base material structure. The first carbonaceous material structure is disposed on the first conductive material structure. More particularly, one portion of the first conductive material structure is a first oxygenated metal compound for contacting the first carbonaceous material structure, and the first oxygen-containing metal compound layer is disposed between the other portion of the first conductive material structure and the first carbonaceous material structure.

Yet another one of the embodiments of the present disclosure provides a capacitor package structure, including a winding capacitor, a package casing, a first conductive pin, and a second conductive pin. The winding capacitor includes a positive foil, a negative foil and two separation papers. One of the two separation papers is disposed between the positive foil and the negative foil, and one of the positive foil and the negative foil is an anti-oxidation electrode foil. The package casing is used for encapsulating the winding capacitor. The first conductive pin has a first embedded portion electrically contacting the positive foil and encapsulated by the package casing, and a first exposed portion passing through the package casing and exposed out of the package casing. The second conductive pin has a second embedded portion electrically contacting the negative foil and encapsulated by the package casing, and a second exposed portion passing through the package casing and exposed out of the package casing. The anti-oxidation electrode foil includes a base material structure, a first conductive material structure, and a first carbonaceous material structure. The base material structure has a top surface and a bottom surface. The first conductive material structure is disposed on the top surface of the base material structure. The first carbonaceous material structure is disposed on the first conductive material structure. More particularly, one portion of the first conductive material structure is a first outermost layer for contacting the first carbonaceous material structure, the first outermost layer of the first conductive material structure is a first oxygen-containing metal compound layer formed by an oxidation process, and the first oxygen-containing metal compound layer is disposed between the other portion of the first conductive material structure and the first carbonaceous material structure so as to prevent oxygen from contacting the other portion of the first conductive material structure.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a capacitor package structure and an anti-oxidation electrode foil thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

First Embodiment

Referring to FIG. 1 to FIG. 4, the first embodiment of the present disclosure provides an anti-oxidation electrode foil F, including a base material structure 1, a first conductive material structure 2 and a first carbonaceous material structure 3. It should be noted that the anti-oxidation electrode foil F is a composite structure.

Figure 1:
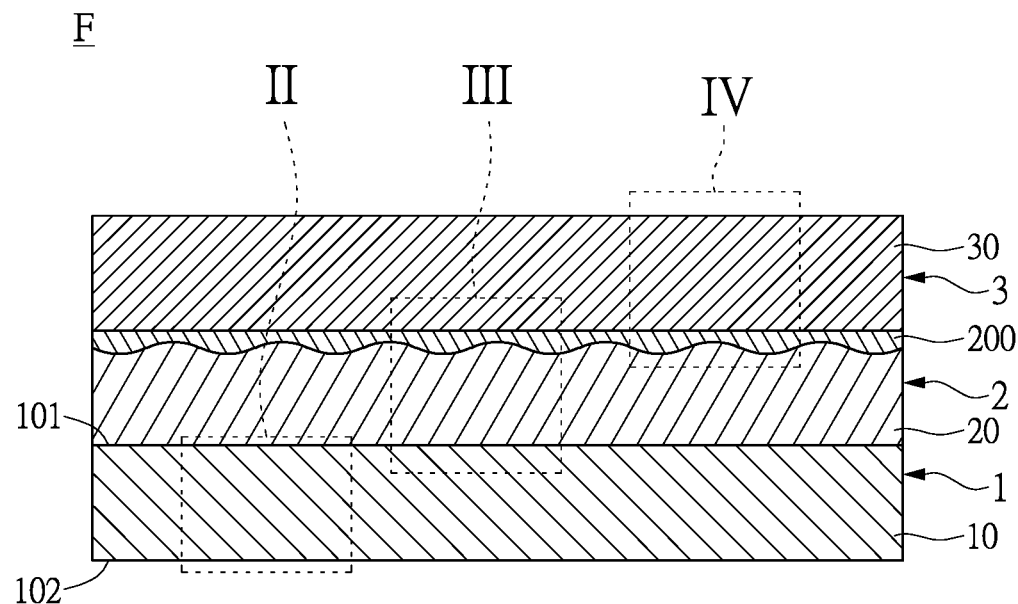
FIG. 1 shows a cross-sectional schematic view of an anti-oxidation electrode foil according to the first embodiment of the present disclosure.

First, as shown in FIG. 1, the base material structure 1 has a top surface 101 and a bottom surface 102, the first conductive material structure 2 is disposed on the top surface 101 of the base material structure 1, and the first carbonaceous material structure 3 is disposed on the first conductive material structure 2. That is to say, the base material structure 1, the first conductive material structure 2 and the first carbonaceous material structure 3 can be stacked on top of one another to form the anti-oxidation electrode foil F.

According to the above description, one portion of the first conductive material structure 2 is a first outermost layer for contacting the first carbonaceous material structure 3, and the first outermost layer of the first conductive material structure 2 is a first oxygen-containing metal compound layer 200 that is formed by an oxidation process. That is to say, when oxygen passes the first carbonaceous material structure 3 to contact the first outermost layer of the first conductive material structure 2, the first outermost layer of the first conductive material structure 2 would be oxidized by the oxygen to form the first oxygen-containing metal compound layer 200. Therefore, the first oxygen-containing metal compound layer 200 would be disposed between the other portion (not oxidized at all) of the first conductive material structure 2 and the first carbonaceous material structure 3 so as to prevent the oxygen from contacting the other portion of the first conductive material structure 2 (i.e., the oxygen would be blocked from touching the other portion of the first conductive material structure 2 by using the first oxygen-containing metal compound layer 200), so that the antioxidative function of the anti-oxidation electrode foil F can be increased by using the first oxygen-containing metal compound layer 200 of the first conductive material structure 2.

Figure 2:
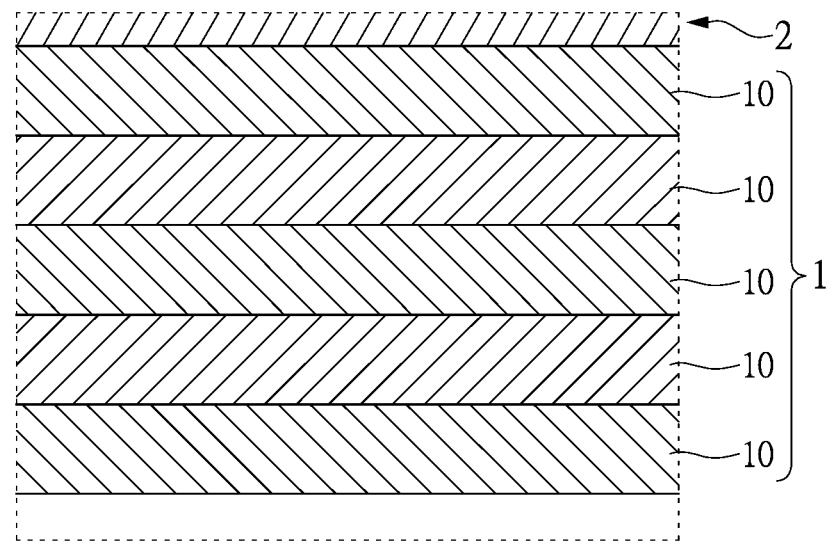
FIG. 2 shows an enlarged view of the portion II of FIG. 1 when a base material structure using a plurality of metal layers.

For example, referring to FIG. 1 and FIG. 2, the base material structure 1 may be a single metal layer 10 (as shown in FIG. 1) or has a plurality of metal layers 10 (as shown in FIG. 2) stacked on top of one another. More particularly, the metal layer 10 used by the base material structure 1 can be made of Al, Cu or other metal materials. Of course, the metal layer 10 used by the base material structure 1 can be replaced by a metal alloy layer, and the metal alloy layer can be made of Al alloy, Cu alloy or other alloy materials. However, that is merely an example and is not meant to limit the scope of the present disclosure.

Figure 3:
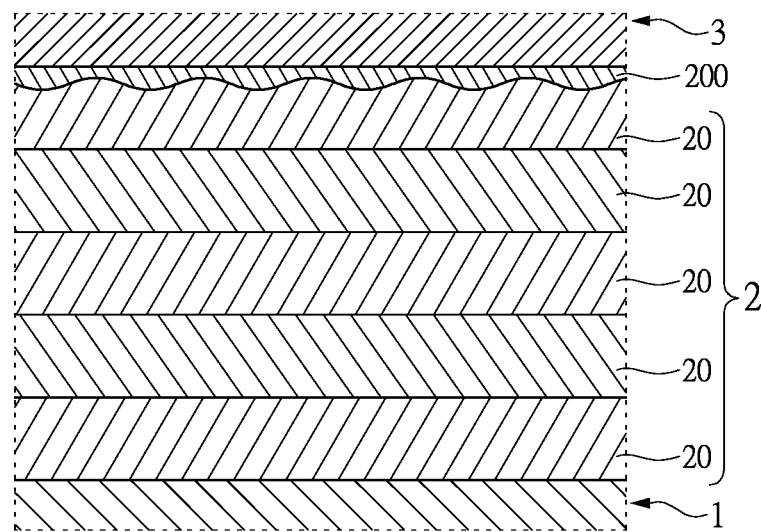
FIG. 3 shows an enlarged view of the portion III of FIG. 1 when a first conductive material structure using a plurality of first conductive material layers.

For another example, referring to FIG. 1 and FIG. 3, the first conductive material structure 2 may be a single first conductive material layer 20 (as shown in FIG. 1) or has a plurality of first conductive material layers 20 (as shown in FIG. 3) stacked on top of one another. It should be noted that when the first conductive material structure 2 is composed of a plurality of first conductive material layers 20 that are stacked on top of one another, the first oxygen-containing metal compound layer 200 is formed on the outermost one of the first conductive material layers 20 so as to contact the first carbonaceous material structure 3 as shown in FIG. 3. More particularly, the first conductive material layer 20 may be one of a first metal layer, a first metal alloy layer and a first metal compound layer. The first metal layer used by the first conductive material layer 20 can be made of Ti, Ni, Cr or other metal materials. The first metal alloy layer used by the first conductive material layer 20 can be made of NiCr alloy or other metal alloy material. The first metal compound layer used by the first conductive material layer 20 can be made of TiNx, TiC, TiOx, Ti(O,N)x, Ti(O,C)x, Ti(C,N)x, Ti(O,N,C)x or other metal compound layers. However, that is merely an example and is not meant to limit the scope of the present disclosure.

Figure 4:
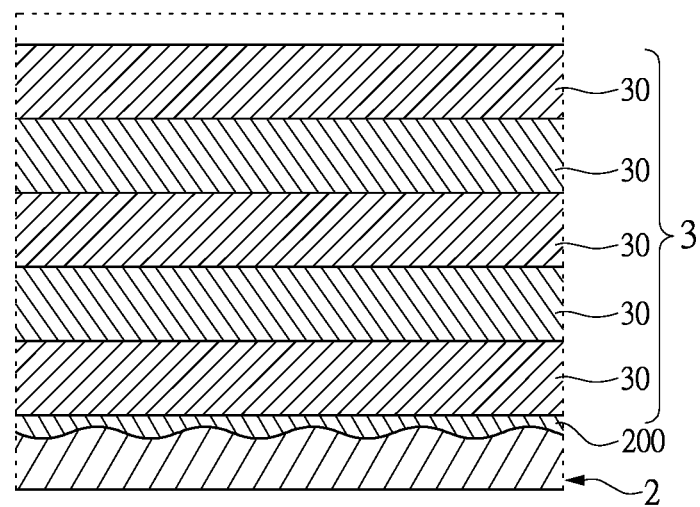
FIG. 4 shows an enlarged view of the portion IV of FIG. 1 when a first carbonaceous material structure using a plurality of first carbonaceous material layers.

For yet another example, referring to FIG. 1 and FIG. 4, the first carbonaceous material structure 3 may be a single first carbonaceous material layer 30 (as shown in FIG. 1) or has a plurality of first carbonaceous material layers 30 (as shown in FIG. 4) stacked on top of one another. It should be noted that when the first carbonaceous material structure 3 has a plurality of first carbonaceous material layers 30 that are stacked on top of one another, the innermost one of first carbonaceous material layers 30 can contact the first oxygen-containing metal compound layer 200 as shown in FIG. 4. More particularly, first carbonaceous material layer 30 used by the first carbonaceous material structure 3 can be made of carbon, graphite, graphene, carbon nanotube, metal carbide, metal nitride carbide, metal carbide oxide, metal nitride oxide or other carbonaceous materials. However, that is merely an example and is not meant to limit the scope of the present disclosure.

It should be noted that the first conductive material structure 2 has a Ti layer, a TiNx layer formed on the Ti layer, and a TiNxCy layer ($0 \leq x \leq 1$) formed on the TiNx layer. The first conductive material structure 2 composed of the Ti layer, the TiNx layer and the TiNxCy layer is heated about 300° C. in a heating chamber so as to transform the TiNxCy layer into a TiNxCyOz layer. When the heating temperature of the heating chamber is increased to 500° C., the component distribution of the TiNxCyOz layer is shown as a gradient variation.

Second Embodiment

Figure 5:
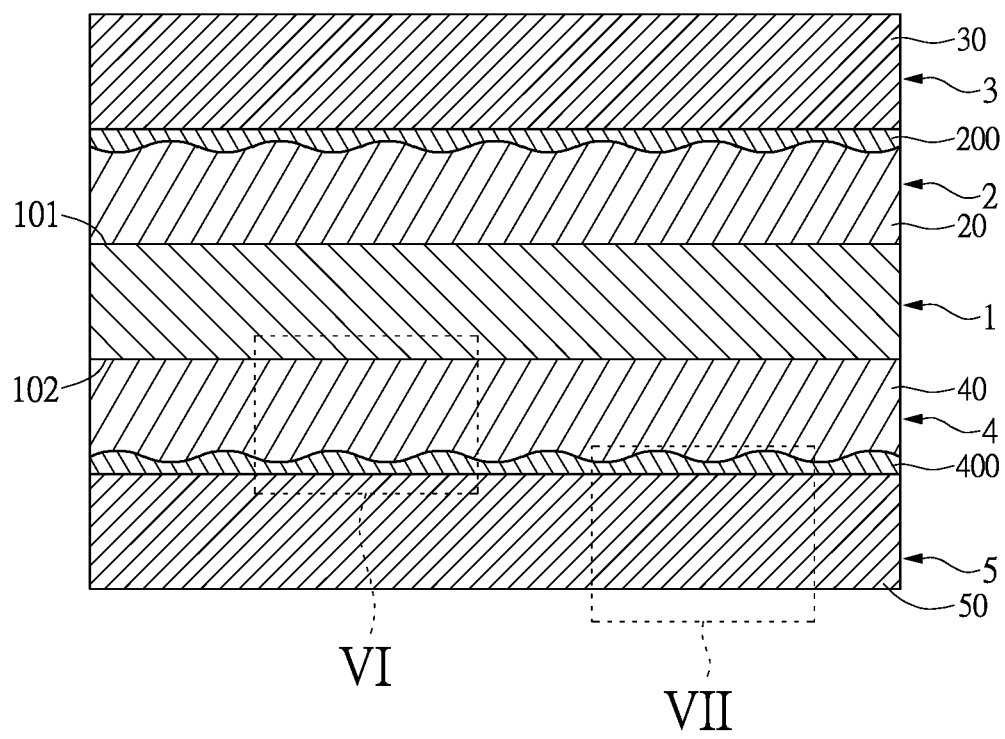
FIG. 5 shows a cross-sectional schematic view of an anti-oxidation electrode foil according to the second embodiment of the present disclosure.
Figure 6:
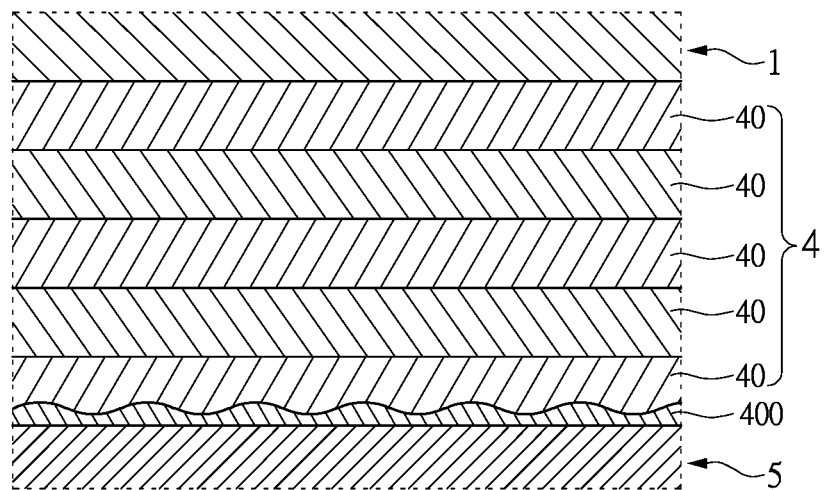
FIG. 6 shows an enlarged view of the portion VI of FIG. 5 when a second conductive material structure using a plurality of second conductive material layers.
Figure 7:
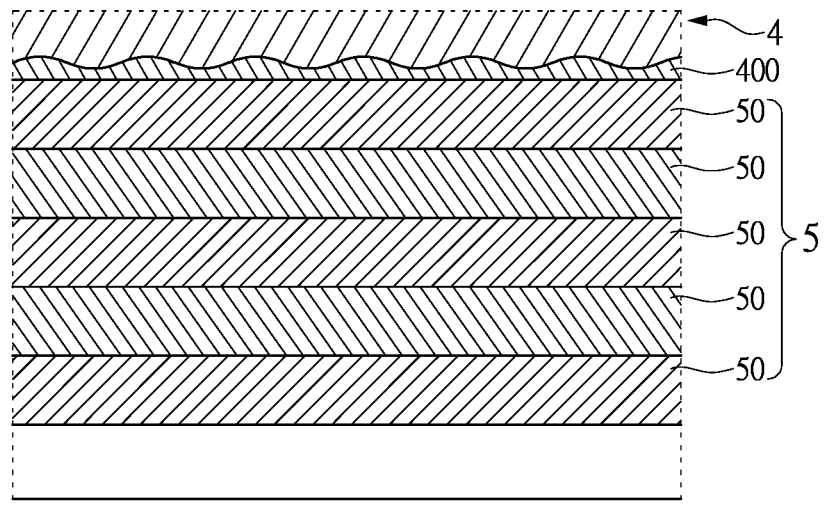
FIG. 7 shows an enlarged view of the portion VII of FIG. 5 when a second carbonaceous material structure using a plurality of second carbonaceous material layers.

Referring to FIG. 5 to FIG. 7, the second embodiment of the present disclosure provides an anti-oxidation electrode foil F, including a base material structure 1, a first conductive material structure 2 and a first carbonaceous material structure 3. As compared with FIG. 5 and FIG. 1, the difference between the second embodiment and the first embodiment is as follows: the anti-oxidation electrode foil F of the second embodiment further includes a second conductive material structure 4 and a second carbonaceous material structure 5. In addition, the second conductive material structure 4 is disposed on the bottom surface 102 of the base material structure 1, and the second carbonaceous material structure 5 is disposed on the second conductive material structure 4.

More particularly, as shown in FIG. 5, one portion of the second conductive material structure 4 is a second outermost layer for contacting the second carbonaceous material structure 5, and the second outermost layer of the second conductive material structure 4 is a second oxygen-containing metal compound layer 400 that is formed by an oxidation process. That is to say, when oxygen passes the second carbonaceous material structure 5 to contact the second outermost layer of the second conductive material structure 4, the second outermost layer of the second conductive material structure 4 would be oxidized by the oxygen to form the second oxygen-containing metal compound layer 400. Therefore, the second oxygen-containing metal compound layer 400 would be disposed between the other portion (not oxidized at all) of the second conductive material structure 4 and the second carbonaceous material structure 5 so as to prevent the oxygen from contacting the other portion of the second conductive material structure 4 (i.e., the oxygen would be blocked from touching the other portion of the second conductive material structure 4 by using the second oxygen-containing metal compound layer 400), so that the antioxidative function of the anti-oxidation electrode foil F can be increased by using the first oxygen-containing metal compound layer 200 of the first conductive material structure 2 and the second oxygen-containing metal compound layer 400 of the second conductive material structure 4.

For example, referring to FIG. 5 and FIG. 6, the second conductive material structure 4 may be a single second conductive material layer 40 (as shown in FIG. 5) or has a plurality of second conductive material layers 40 (as shown in FIG. 6) stacked on top of one another. It should be noted that when the second conductive material structure 4 is composed of a plurality of second conductive material layers 40 that are stacked on top of one another, the second oxygen-containing metal compound layer 400 is formed on the outermost one of the second conductive material layers 40 so as to contact the second carbonaceous material structure 5 as shown in FIG. 6. More particularly, the second conductive material layer 40 may be one of a second metal layer, a second metal alloy layer and a second metal compound layer. However, that is merely an example and is not meant to limit the scope of the present disclosure.

For another example, referring to FIG. 5 and FIG. 7, the second carbonaceous material structure 5 may be a single second carbonaceous material layer 50 (as shown in FIG. 5) or has a plurality of second carbonaceous material layers 50 (as shown in FIG. 7) stacked on top of one another. It should be noted that when the second carbonaceous material structure 5 has a plurality of second carbonaceous material layers 50 that are stacked on top of one another, the innermost one of second carbonaceous material layers 50 can contact the second oxygen-containing metal compound layer 400 as shown in FIG. 7.

Third Embodiment

Figure 8:
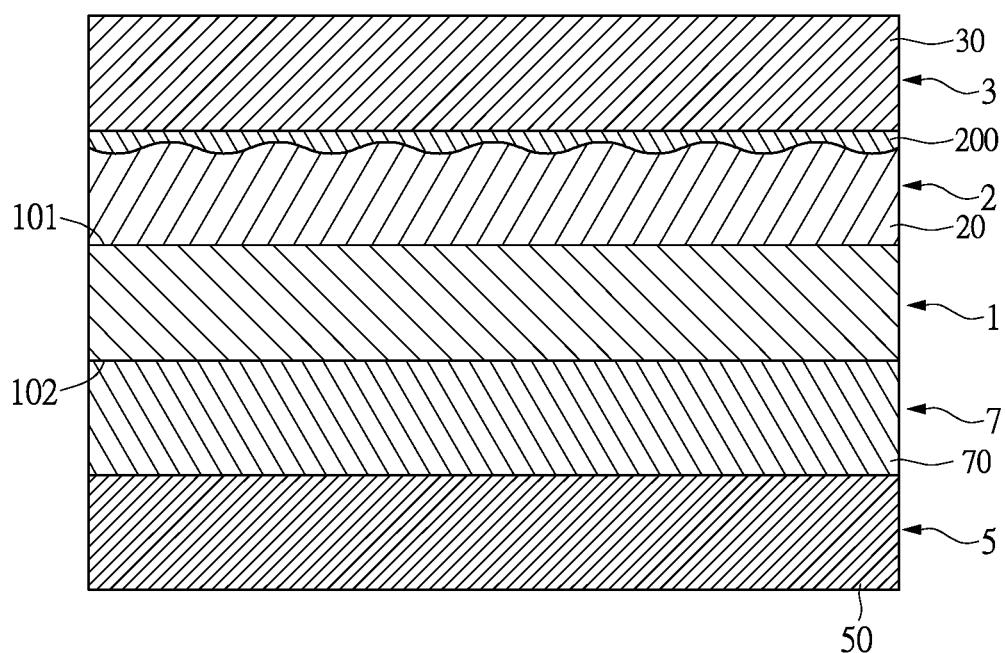
FIG. 8 shows a cross-sectional schematic view of an anti-oxidation electrode foil according to the third embodiment of the present disclosure.

Referring to FIG. 8, the third embodiment of the present disclosure provides an anti-oxidation electrode foil F, including a base material structure 1, a first conductive material structure 2 and a first carbonaceous material structure 3. As compared with FIG. 8 and FIG. 1, the difference between the third embodiment and the first embodiment is as follows: the anti-oxidation electrode foil F of the third embodiment further includes a low activity metal structure (i.e., a second low activity metal structure 7) and a second carbonaceous material structure 5. In addition, the second low activity metal structure 7 is disposed on the bottom surface 102 of the base material structure 1, and the second carbonaceous material structure 5 is disposed on the second low activity metal structure 7. More particularly, when the oxygen passes through the second carbonaceous material structure 5, the oxygen is obstructed by the second low activity metal structure 7 for preventing the oxygen from contacting the base material structure 1. That is to say, the oxygen would be blocked from touching the base material structure 1 by using the second low activity metal structure 7.

For example, the second low activity metal structure 7 may be a single second low activity metal layer 70 (as shown in FIG. 8) or has a plurality of second low activity metal layers 70 stacked on top of one another. More particularly, the second low activity metal layer 70 used by the second low activity metal structure 7 can be made of mercury, silver, platinum, golden or other low activity metal materials.

However, that is merely an example and is not meant to limit the scope of the present disclosure.

For another example, the second carbonaceous material structure 5 may be a single second carbonaceous material layer 50 (as shown in FIG. 8) or has a plurality of second carbonaceous material layers 50 stacked on top of one another. More particularly, the second carbonaceous material layer 50 used by the second carbonaceous material structure 5 can be made of carbon, graphite, graphene, carbon nanotube, metal carbide, metal nitride carbide, metal carbide oxide, metal nitride oxide or other carbonaceous materials. However, that is merely an example and is not meant to limit the scope of the present disclosure.

Fourth Embodiment

Referring to FIG. 9 to FIG. 12, the fourth embodiment of the present disclosure provides an anti-oxidation electrode foil F, including a base material structure 1, a first low activity metal structure 6 and a first carbonaceous material structure 3.

Figure 9:
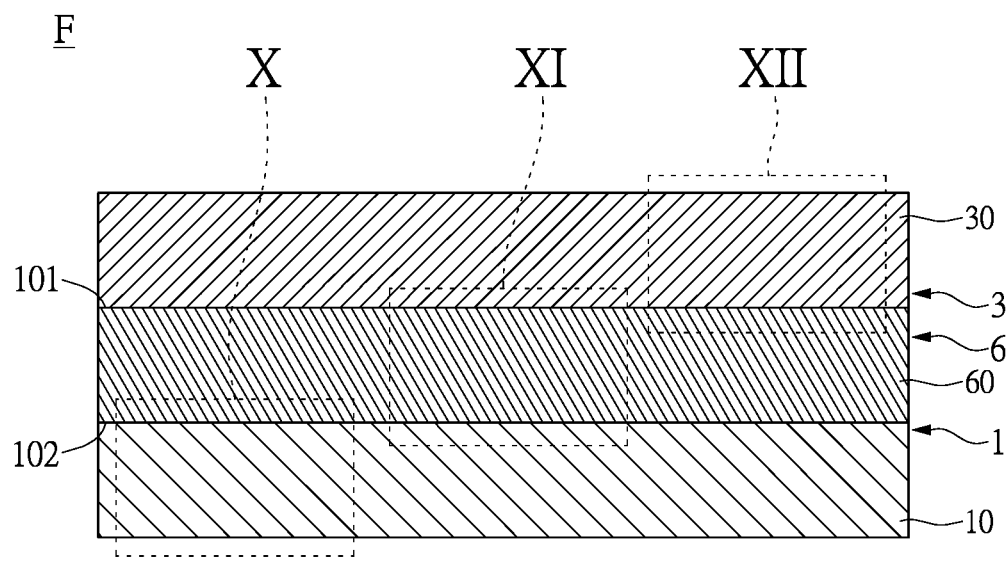
FIG. 9 shows a cross-sectional schematic view of an anti-oxidation electrode foil according to the fourth embodiment of the present disclosure.

First, as shown in FIG. 9, the base material structure 1 has a top surface 101 and a bottom surface 102, the first low activity metal structure 6 is disposed on the top surface 101 of the base material structure 1, and the first carbonaceous material structure 3 is disposed on the first low activity metal structure 6. Therefore, when oxygen passes through the first carbonaceous material structure 3, the oxygen is obstructed by the first low activity metal structure 6 for preventing the oxygen from contacting the base material structure 1, so that the antioxidative function of the anti-oxidation electrode foil F can be increased by using the first low activity metal structure 6.

Figure 10:
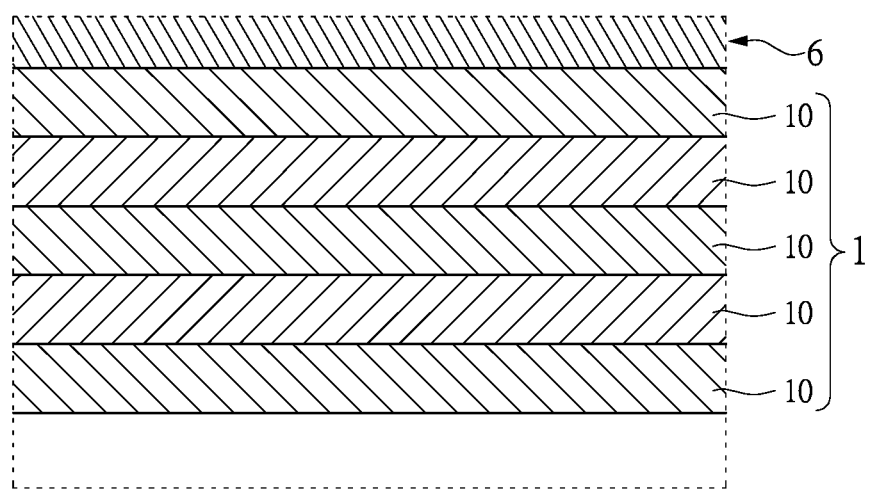
FIG. 10 shows an enlarged view of the portion X of FIG. 9 when a base material structure using a plurality of metal layers.

For example, referring to FIG. 9 and FIG. 10, the base material structure 1 may be a single metal layer 10 (as shown in FIG. 9) or has a plurality of metal layers 10 (as shown in FIG. 10) stacked on top of one another. More particularly, the metal layer 10 used by the base material structure 1 can be made of Al, Cu or other metal materials. Of course, the metal layer 10 used by the base material structure 1 can be replaced by a metal alloy layer, and the metal alloy layer can be made of Al alloy, Cu alloy or other alloy materials. However, that is merely an example and is not meant to limit the scope of the present disclosure.

Figure 11:
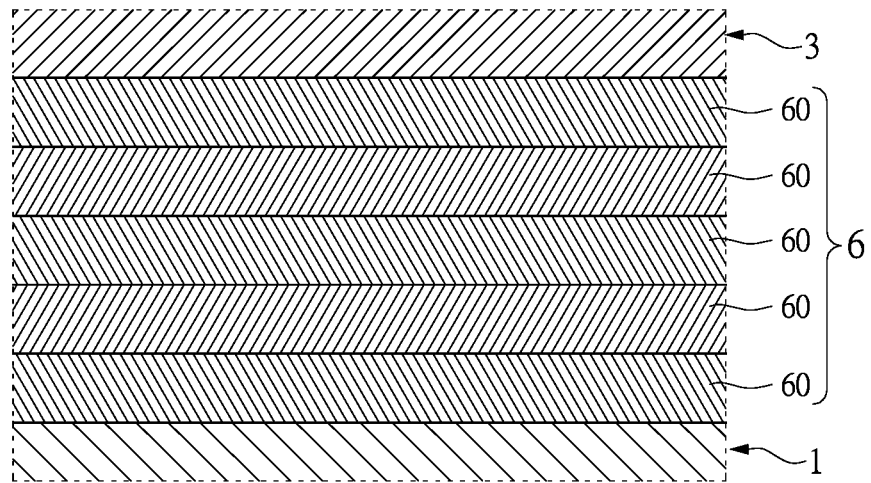
FIG. 11 shows an enlarged view of the portion XI of FIG. 9 when a first low activity metal structure using a plurality of first low activity metal layers.

For another example, referring to FIG. 9 and FIG. 11, the first low activity metal structure 6 may be a single first low activity metal layer 60 (as shown in FIG. 9) or has a plurality of first low activity metal layers 60 (as shown in FIG. 11) stacked on top of one another. More particularly, the first low activity metal layer 60 used by the first low activity metal structure 6 can be made of mercury, silver, platinum, golden or other low activity metal materials. However, that is merely an example and is not meant to limit the scope of the present disclosure.

Figure 12:
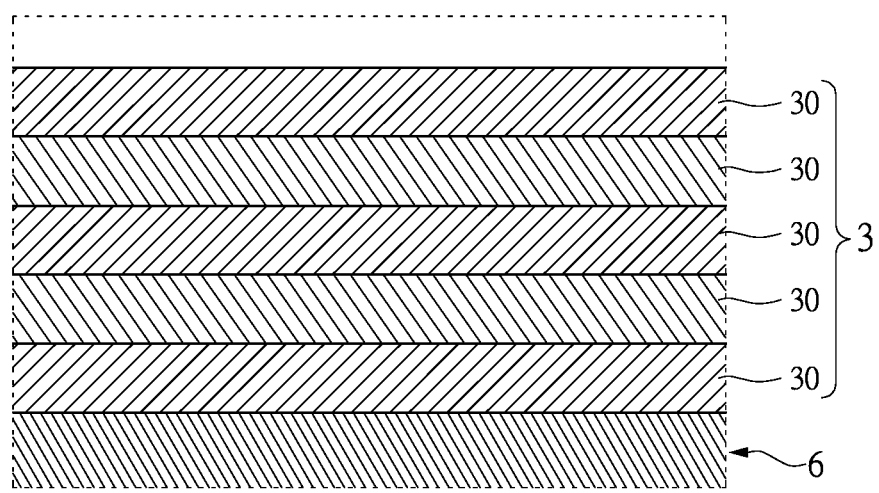
FIG. 12 shows an enlarged view of the portion XII of FIG. 9 when a first carbonaceous material structure using a plurality of first carbonaceous material layers.

For yet another example, referring to FIG. 9 and FIG. 12, the first carbonaceous material structure 3 may be a single first carbonaceous material layer 30 (as shown in FIG. 9) or has a plurality of first carbonaceous material layers 30 (as shown in FIG. 12) stacked on top of one another. More particularly, first carbonaceous material layer 30 used by the first carbonaceous material structure 3 can be made of carbon, graphite, graphene, carbon nanotube, metal carbide, metal nitride carbide, metal carbide oxide, metal nitride oxide or other carbonaceous materials. However, that is merely an example and is not meant to limit the scope of the present disclosure.

Fifth Embodiment

Figure 13:
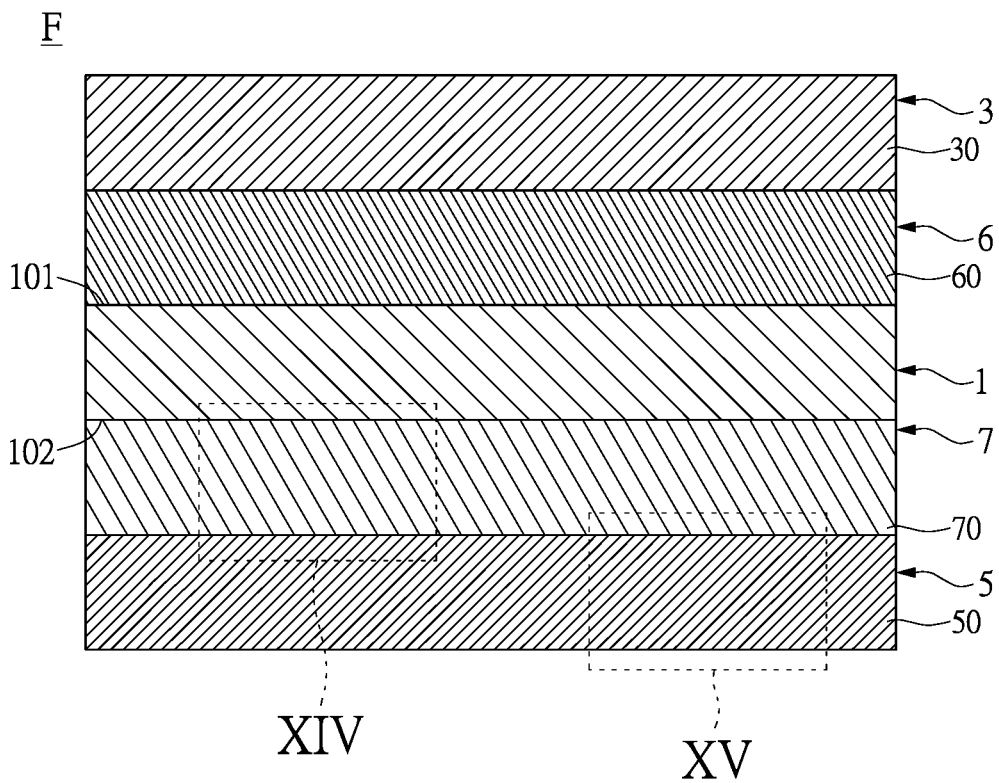
FIG. 13 shows a cross-sectional schematic view of an anti-oxidation electrode foil according to the fifth embodiment of the present disclosure.
Figure 14:
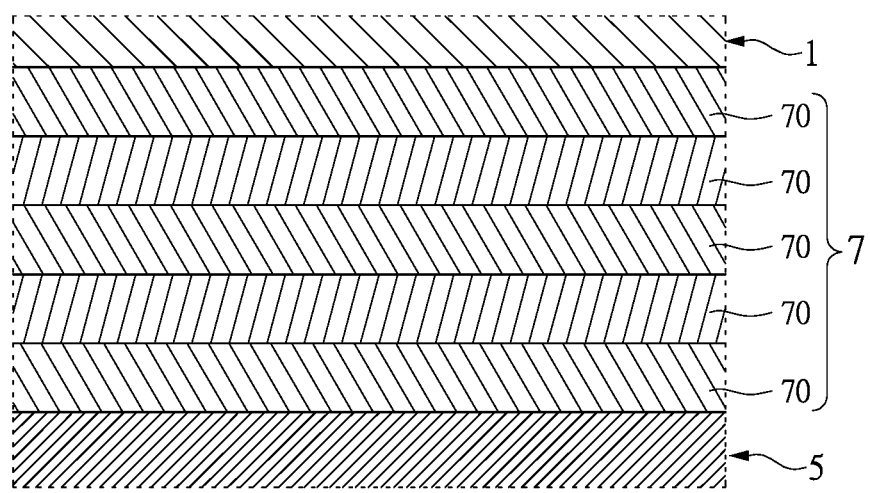
FIG. 14 shows an enlarged view of the portion XIV of FIG. 13 when a second low activity metal structure using a plurality of second low activity metal layers.
Figure 15:
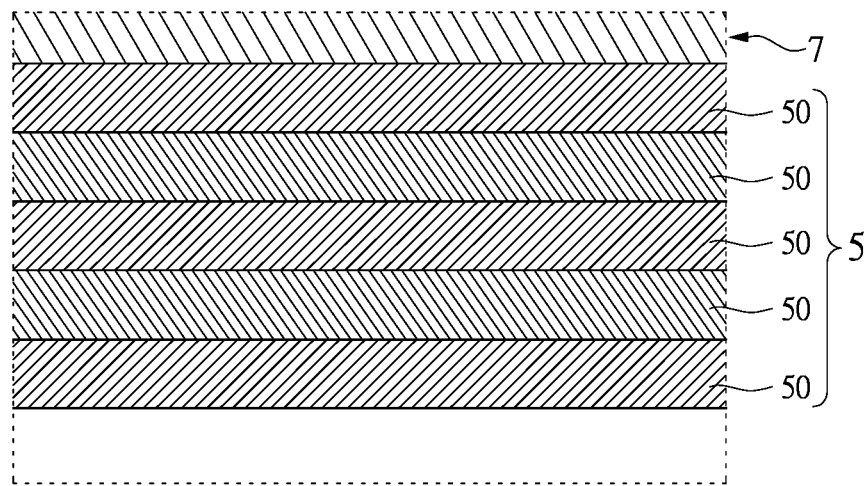
FIG. 15 shows an enlarged view of the portion XV of FIG. 13 when a second carbonaceous material structure using a plurality of second carbonaceous material layers.

Referring to FIG. 13 to FIG. 15, the fifth embodiment of the present disclosure provides an anti-oxidation electrode foil F, including a base material structure 1, a first low activity metal structure 6 and a first carbonaceous material structure 3. As compared with FIG. 13 and FIG. 9, the difference between the fifth embodiment and the fourth embodiment is as follows: the anti-oxidation electrode foil F of the fifth embodiment further includes a second low activity metal structure 7 and a second carbonaceous material structure 5. In addition, the second low activity metal structure 7 is disposed on the bottom surface 102 of the base material structure 1, and the second carbonaceous material structure 5 is disposed on the second low activity metal structure 7. More particularly, when the oxygen passes through the second carbonaceous material structure 5, the oxygen is obstructed by the second low activity metal structure 7 for preventing the oxygen from contacting the base material structure 1 (i.e., the oxygen would be blocked from touching the base material structure 1 by using the second low activity metal structure 7), so that the antioxidative function of the anti-oxidation electrode foil F can be increased by using the first low activity metal structure 6 and the second low activity metal structure 7.

For example, referring to FIG. 13 and FIG. 14, the second low activity metal structure 7 may be a single second low activity metal layer 70 (as shown in FIG. 13) or has a plurality of second low activity metal layers 70 (as shown in FIG. 14) stacked on top of one another. More particularly, the second low activity metal layer 70 used by the second low activity metal structure 7 can be made of mercury, silver, platinum, golden or other low activity metal materials. However, that is merely an example and is not meant to limit the scope of the present disclosure.

For another example, referring to FIG. 13 and FIG. 15, the second carbonaceous material structure 5 may be a single second carbonaceous material layer 50 (as shown in FIG. 13) or has a plurality of second carbonaceous material layers 50 (as shown in FIG. 15) stacked on top of one another. More particularly, the second carbonaceous material layer 50 used by the second carbonaceous material structure 5 can be made of carbon, graphite, graphene, carbon nanotube, metal carbide, metal nitride carbide, metal carbide oxide, metal nitride oxide or other carbonaceous materials. However, that is merely an example and is not meant to limit the scope of the present disclosure.

Sixth Embodiment

Figure 16:
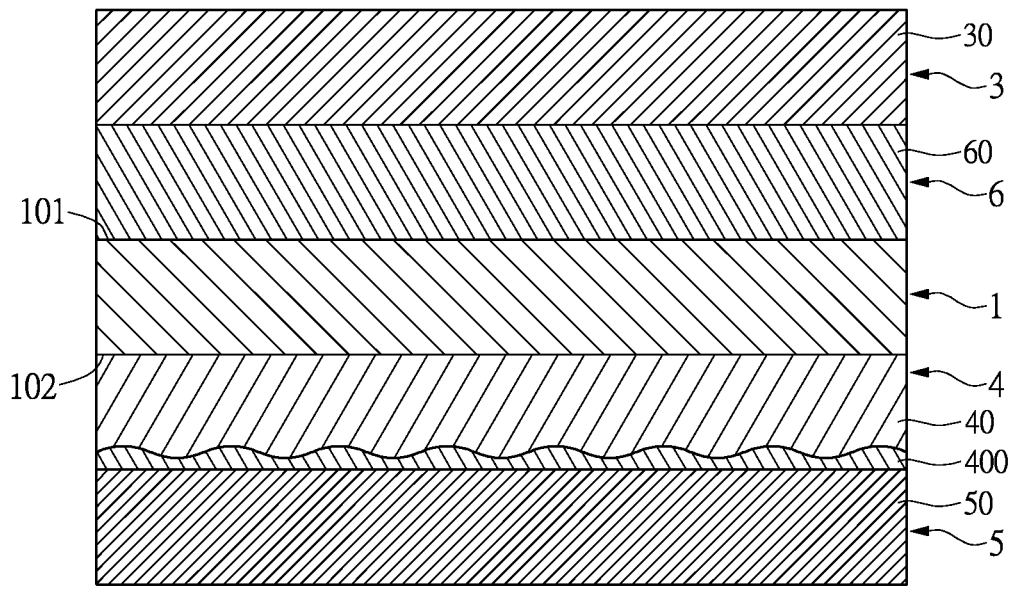
FIG. 16 shows a cross-sectional schematic view of an anti-oxidation electrode foil according to the sixth embodiment of the present disclosure.

Referring to FIG. 16, the sixth embodiment of the present disclosure provides an anti-oxidation electrode foil F, including a base material structure 1, a first low activity metal structure 6 and a first carbonaceous material structure 3. As compared with FIG. 16 and FIG. 9, the difference between the sixth embodiment and the fourth embodiment is as follows: the anti-oxidation electrode foil F of the sixth embodiment further includes a conductive material structure (i.e., a second conductive material structure 4) and a second carbonaceous material structure 5. In addition, the second conductive material structure 4 is disposed on the bottom surface 102 of the base material structure 1, and the second carbonaceous material structure 5 is disposed on the second conductive material structure 4. More particularly, one portion of the second conductive material structure 4 is an outermost layer for contacting the second carbonaceous material structure 5, the outermost layer of the second conductive material structure 4 is a second oxygen-containing metal compound layer 400 formed by an oxidation process. Therefore, the second oxygen-containing metal compound layer 400 can be disposed between the other portion of the second conductive material structure 4 and the second carbonaceous material structure 5 so as to prevent the oxygen from contacting the other portion of the second conductive material structure 4. That is to say, the oxygen would be blocked from touching the other portion of the second conductive material structure 4 by using the second oxygen-containing metal compound layer 400.

Seventh Embodiment

Figure 17:
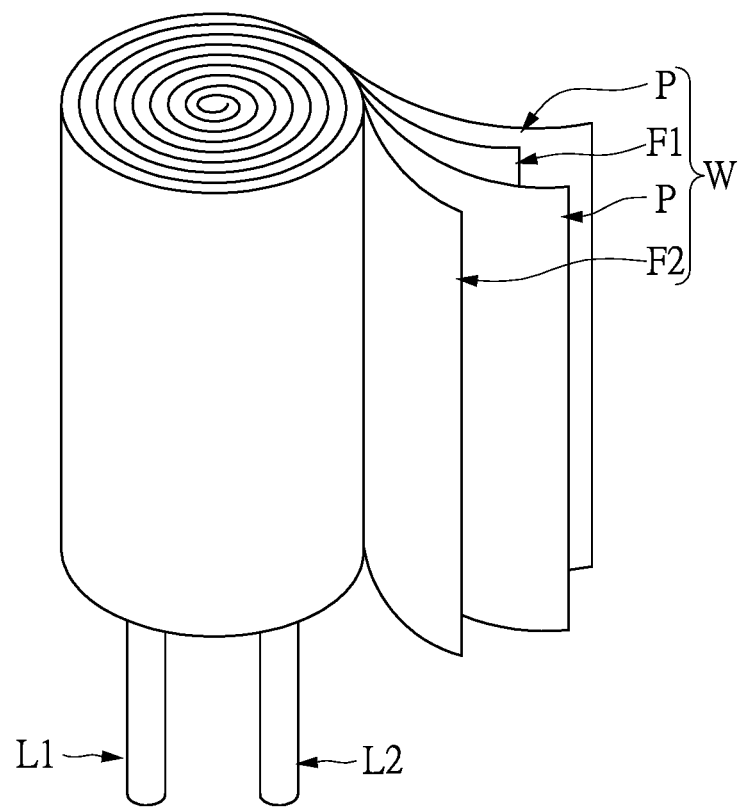
FIG. 17 shows a perspective schematic view of two anti-oxidation electrode foils, two separation papers, a first conductive pin and a second conductive pin mated with each other according to the seventh embodiment of the present disclosure.
Figure 18:
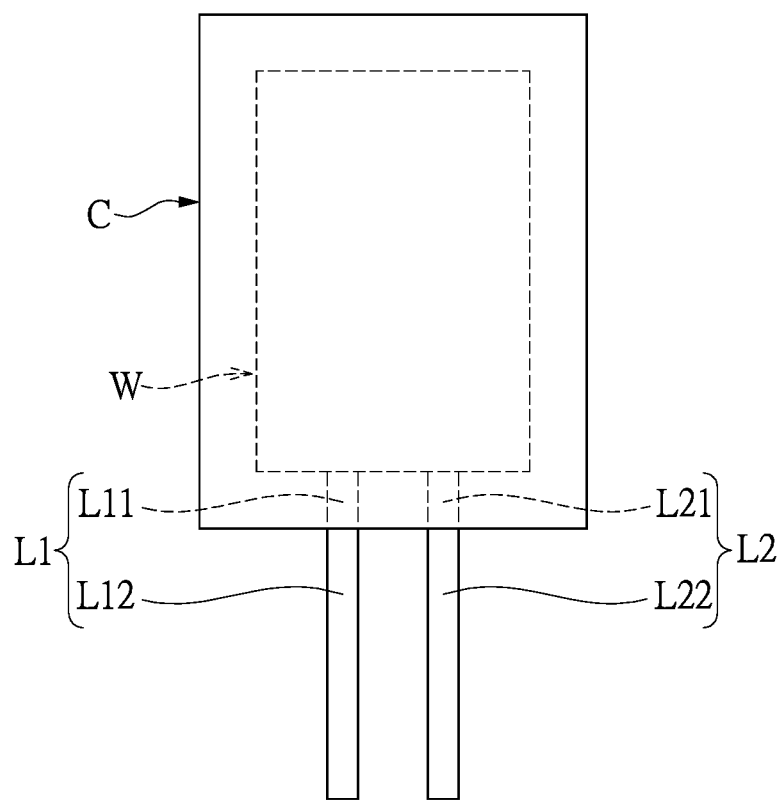
FIG. 18 shows a lateral schematic view of a capacitor package structure according to the seventh embodiment of the present disclosure.

Referring to FIG. 17 and FIG. 18, the seventh embodiment of the present disclosure provides a capacitor package structure Z, including a winding capacitor W, a package casing C, a first conductive pin L1 and a second conductive pin L2. For example, the capacitor package structure Z may be a wound solid electrolytic capacitor package structure.

First, as shown in FIG. 17, the winding capacitor W includes a positive foil F1, a negative foil F2, and two separation papers P. In addition, one of the two separation papers P is disposed between the positive foil F1 and the negative foil F2, and one of the positive foil F1 and the negative foil F2 is an anti-oxidation electrode foil F.

Moreover, as shown in FIG. 18, the package casing C can be used to encapsulate the winding capacitor W so as to prevent the winding capacitor W from being exposed from the package casing C. In addition, the first conductive pin L1 has a first embedded portion L11 electrically contacting the positive foil F1 and encapsulated by the package casing C, and a first exposed portion L12 passing through the package casing C and exposed out of the package casing C. The second conductive pin L2 has a second embedded portion L21 electrically contacting the negative foil F2 and encapsulated by the package casing C, and a second exposed portion L22 passing through the package casing C and exposed out of the package casing C.

It should be noted that the winding capacitor W can use the anti-oxidation electrode foil F of one of the first to the sixth embodiments.

In conclusion, the first conductive material structure 2 is disposed on the top surface 101 of the base material structure 1, the first carbonaceous material structure 3 is disposed on the first conductive material structure 2, and one portion of the first conductive material structure 2 is a first oxygen-containing metal compound layer 200 for contacting the first carbonaceous material structure 3. Therefore, the first oxygen-containing metal compound layer 200 would be disposed between the other portion of the first conductive material structure 2 and the first carbonaceous material structure 3 so as to prevent the oxygen from contacting the other portion of the first conductive material structure 2, so that the antioxidative function of the anti-oxidation electrode foil F can be increased by using the first oxygen-containing metal compound layer 200 of the first conductive material structure 2.

That is to say, when oxygen passes the first carbonaceous material structure 3 to contact the first outermost layer of the first conductive material structure 2, the first outermost layer of the first conductive material structure 2 would be oxidized by the oxygen to form the first oxygen-containing metal compound layer 200. Therefore, the antioxidative function of the anti-oxidation electrode foil F is increased by using the first oxygen-containing metal compound layer 200 of the first conductive material structure 2.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. An anti-oxidation electrode foil, comprising:
   a base material structure having a top surface and a bottom surface;
   a first conductive material structure disposed on the top surface of the base material structure; and
   a first carbonaceous material structure disposed on the first conductive material structure;
   wherein one portion of the first conductive material structure is a first outermost layer for contacting the first carbonaceous material structure, the first outermost layer of the first conductive material structure is a first oxygen-containing metal compound layer formed by an oxidation process, and the first oxygen-containing metal compound layer is disposed between the other portion of the first conductive material structure and the first carbonaceous material structure so as to prevent oxygen from contacting the other portion of the first conductive material structure;
   wherein, the first conductive material structure composed of a Ti layer, a TiNx layer formed on the Ti layer, and a TiNxCy layer (0≤x≤1) formed on the TiNx layer; the first conductive material structure is heated so as to transform the TiNxCy layer into a TiNxCyOz layer.

2. The anti-oxidation electrode foil of claim 1, further comprising:
   a second conductive material structure disposed on the bottom surface of the base material structure; and
   a second carbonaceous material structure disposed on the second conductive material structure;
   wherein one portion of the second conductive material structure is a second outermost layer for contacting the second carbonaceous material structure, the second outermost layer of the second conductive material structure is a second oxygen-containing metal compound layer formed by an oxidation process, and the second oxygen-containing metal compound layer is disposed between the other portion of the second conductive material structure and the second carbonaceous material structure so as to prevent the oxygen from contacting the other portion of the second conductive material structure.

3. The anti-oxidation electrode foil of claim 2, wherein the base material structure is a single metal layer or has a plurality of metal layers stacked on top of one another, wherein the first conductive material structure is a single first conductive material layer or has a plurality of first conductive material layers stacked on top of one another, and the first carbonaceous material structure is a single first carbonaceous material layer or has a plurality of first carbonaceous material layers stacked on top of one another, wherein the second conductive material structure is a single second conductive material layer or has a plurality of second conductive material layers stacked on top of one another, and the second carbonaceous material structure is a single second carbonaceous material layer or has a plurality of second carbonaceous material layers stacked on top of one another, wherein the first conductive material layer is one of a first metal layer, a first metal alloy layer and a first metal compound layer, and the second conductive material layer is one of a second metal layer, a second metal alloy layer and a second metal compound layer.

4. The anti-oxidation electrode foil of claim 1, further comprising:
a low activity metal structure disposed on the bottom surface of the base material structure; and
a second carbonaceous material structure disposed on the low activity metal structure;
when the oxygen passes through the second carbonaceous material structure, the oxygen is obstructed by the low activity metal structure for preventing the oxygen from contacting the base material structure.

5. An anti-oxidation electrode foil, comprising:
a base material structure;
a first conductive material structure disposed on the base material structure; and
a first carbonaceous material structure disposed on the first conductive material structure;
wherein one portion of the first conductive material structure is a first oxygenated metal compound for contacting the first carbonaceous material structure, and the first oxygen-containing metal compound layer is disposed between the other portion of the first conductive material structure and the first carbonaceous material structure;
wherein, the first conductive material structure composed of a Ti layer, a TiNx layer formed on the Ti layer, and a TiNxCy layer ($0 \leq x \leq 1$) formed on the TiNx layer; the first conductive material structure is heated so as to transform the TiNxCy layer into a TiNxCyOz layer.

6. The anti-oxidation electrode foil of claim 5, further comprising:
a second conductive material structure disposed on the base material structure; and
a second carbonaceous material structure disposed on the second conductive material structure;
wherein one portion of the second conductive material structure is a second oxygenated metal compound for contacting the second carbonaceous material structure, and the second oxygen-containing metal compound layer is disposed between the other portion of the second conductive material structure and the second carbonaceous material structure.

7. The anti-oxidation electrode foil of claim 5, further comprising:
a low activity metal structure disposed on the base material structure; and
a second carbonaceous material structure disposed on the low activity metal structure;
wherein when the oxygen passes through the second carbonaceous material structure, the oxygen is obstructed by the low activity metal structure for preventing the oxygen from contacting the base material structure.

8. A capacitor package structure, comprising:
a winding capacitor including a positive foil, a negative foil, and two separation papers, wherein one of the two separation papers is disposed between the positive foil and the negative foil, and one of the positive foil and the negative foil is an anti-oxidation electrode foil;
a package casing for encapsulating the winding capacitor;
a first conductive pin having a first embedded portion electrically contacting the positive foil and encapsulated by the package casing, and a first exposed portion passing through the package casing and exposed out of the package casing; and
a second conductive pin having a second embedded portion electrically contacting the negative foil and encapsulated by the package casing, and a second exposed portion passing through the package casing and exposed out of the package casing;
wherein the anti-oxidation electrode foil includes:
a base material structure having a top surface and a bottom surface;
a first conductive material structure disposed on the top surface of the base material structure; and
a first carbonaceous material structure disposed on the first conductive material structure;
wherein one portion of the first conductive material structure is a first outermost layer for contacting the first carbonaceous material structure, the first outermost layer of the first conductive material structure is a first oxygen-containing metal compound layer formed by an oxidation process, and the first oxygen-containing metal compound layer is disposed between the other portion of the first conductive material structure and the first carbonaceous material structure so as to prevent oxygen from contacting the other portion of the first conductive material structure;
wherein, the first conductive material structure composed of a Ti layer, a TiNx layer formed on the Ti layer, and a TiNxCy layer ($0 \leq x \leq 1$) formed on the TiNx layer; the first conductive material structure is heated so as to transform the TiNxCy layer into a TiNxCyOz layer.

9. The capacitor package structure of claim 8, wherein the anti-oxidation electrode foil further includes:
a second conductive material structure disposed on the bottom surface of the base material structure; and
a second carbonaceous material structure disposed on the second conductive material structure;
wherein one portion of the second conductive material structure is a second outermost layer for contacting the second carbonaceous material structure, the second outermost layer of the second conductive material structure is a second oxygen-containing metal compound layer formed by an oxidation process, and the second oxygen-containing metal compound layer is disposed between the other portion of the second conductive material structure and the second carbonaceous material structure so as to prevent the oxygen from contacting the other portion of the second conductive material structure.

10. The capacitor package structure of claim 8, wherein the anti-oxidation electrode foil further includes:
a low activity metal structure disposed on the bottom surface of the base material structure; and
a second carbonaceous material structure disposed on the low activity metal structure;
wherein when the oxygen passes through the second carbonaceous material structure, the oxygen is obstructed by the low activity metal structure for preventing the oxygen from contacting the base material structure.

* * * * *